(12) United States Patent
Upmanue et al.

(10) Patent No.: US 9,846,495 B2
(45) Date of Patent: Dec. 19, 2017

(54) HUMAN MACHINE INTERFACE SYSTEM FOR CONTROLLING VEHICULAR GRAPHICAL USER INTERFACE DISPLAY

(71) Applicants: DENSO International America, Inc., Southfield, MI (US); Ford Global Technologies, LLC., Dearborn, MI (US)

(72) Inventors: Vikas Upmanue, Farmington Hills, MI (US); Laith Daman, Novi, MI (US); Yu Zhang, Farmington Hills, MI (US); Martin Nespolo, Grosse Pointe Woods, MI (US); Kyle Golsch, Pontiac, MI (US); Sibu Varughese, Sterling Heights, MI (US); Justin McBride, South Lyon, MI (US); Pietro Buttolo, Dearborn Heights, MI (US); Jeffry Allen Greenberg, Ann Arbor, MI (US); Parrish F. Hanna, Bloomfield Hills, MI (US); Cynthia M. Neubecker, Westland, MI (US)

(73) Assignees: DENSO International America, Inc., Southfield, MI (US); FORD GLOBAL TECHNOLOGIES LLC, Dearborn, MI (US)

( * ) Notice: Subject to any disclaimer, the term of this patent is extended or adjusted under 35 U.S.C. 154(b) by 110 days.

(21) Appl. No.: 14/807,262

(22) Filed: Jul. 23, 2015

(65) Prior Publication Data

US 2017/0024022 A1    Jan. 26, 2017

(51) Int. Cl.
*B60K 35/00*    (2006.01)
*G06F 3/0354*    (2013.01)
(Continued)

(52) U.S. Cl.
CPC ............. *G06F 3/038* (2013.01); *B60K 35/00* (2013.01); *G06F 3/016* (2013.01); *G06F 3/0338* (2013.01);
(Continued)

(58) Field of Classification Search
None
See application file for complete search history.

(56) References Cited

U.S. PATENT DOCUMENTS

| 2004/0132498 | A1* | 7/2004 | Clabunde | G05G 9/047 |
| | | | | 455/566 |
| 2007/0091070 | A1* | 4/2007 | Larsen | G06F 3/0213 |
| | | | | 345/168 |

(Continued)

*Primary Examiner* — Kent Chang
*Assistant Examiner* — Benjamin Morales Fernande
(74) *Attorney, Agent, or Firm* — Harness, Dickey & Pierce, P.L.C.

(57) ABSTRACT

A human machine interface (HMI) system controls operation of a graphical user interface (GUI) being displayed on a display located in a vehicle. The HMI system includes an interface device, an interface operation module, and a device selection module. The interface device is operable to control the GUI and includes a knob member and a touchpad. The interface operation module receives input data from the interface device in response to an operation of the interface device. The device selection module designates at least one of the knob member or the touchpad as an active device based on a device selection criteria. The interface operation module transmits data from an active device to a display module controlling the GUI and disregards data from an inactive device.

17 Claims, 7 Drawing Sheets

(51) Int. Cl.
    *G06F 3/0362*     (2013.01)
    *G06F 3/038*     (2013.01)
    *G06F 3/0487*     (2013.01)
    *G06F 3/01*     (2006.01)
    *G06F 3/0338*     (2013.01)

(52) U.S. Cl.
    CPC ........ *G06F 3/0362* (2013.01); *G06F 3/03547* (2013.01); *G06F 3/03548* (2013.01)

(56) References Cited

U.S. PATENT DOCUMENTS

| | | | | |
|---|---|---|---|---|
| 2007/0236470 A1* | 10/2007 | Abanami | G06F 3/03547 | 345/173 |
| 2011/0167947 A1* | 7/2011 | Hisatsugu | G06F 3/0202 | 74/491 |
| 2011/0307824 A1* | 12/2011 | Minamitani | B60K 37/06 | 715/781 |
| 2012/0123636 A1* | 5/2012 | Hisatsugu | B60K 35/00 | 701/36 |
| 2013/0050094 A1* | 2/2013 | Rhee | G06F 3/0418 | 345/168 |
| 2013/0194214 A1* | 8/2013 | Minamitani | G06F 3/02 | 345/173 |
| 2014/0055357 A1* | 2/2014 | Dave | G06F 1/3231 | 345/168 |
| 2016/0070275 A1* | 3/2016 | Anderson | G06F 3/165 | 700/94 |
| 2016/0085321 A1* | 3/2016 | Jung | G06F 3/0362 | 345/184 |

* cited by examiner

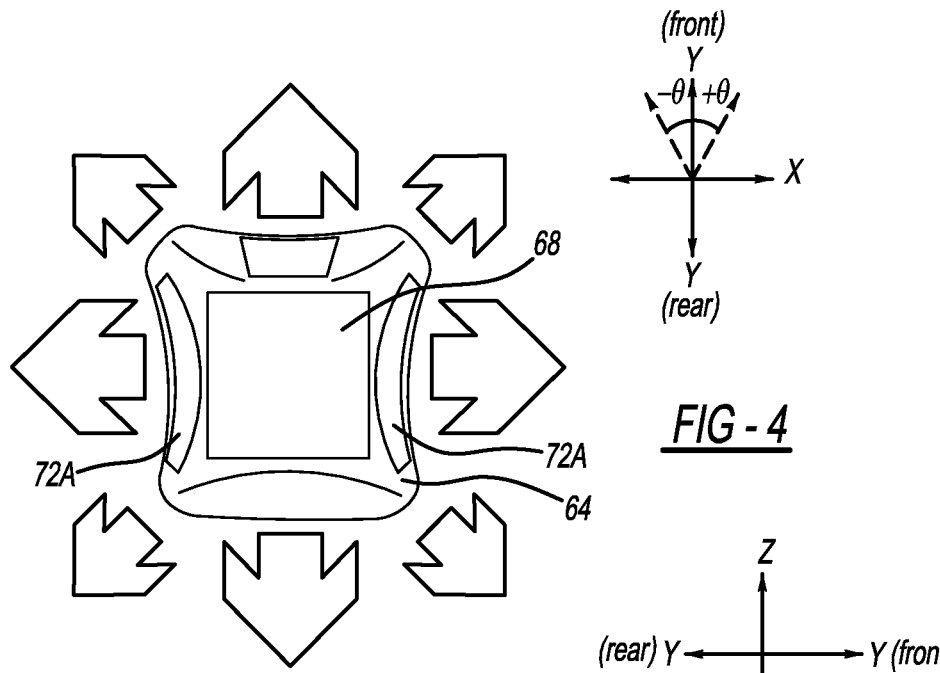
FIG - 4
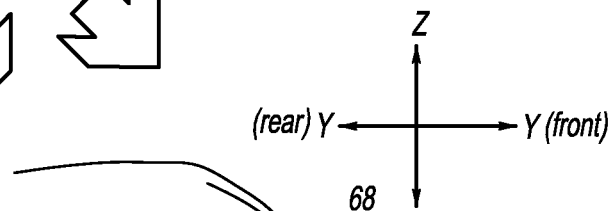
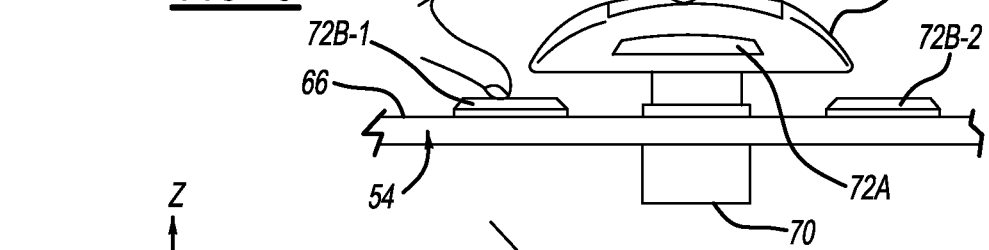
FIG - 5
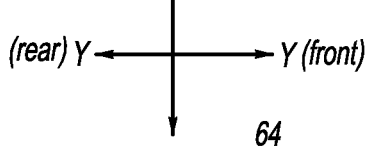
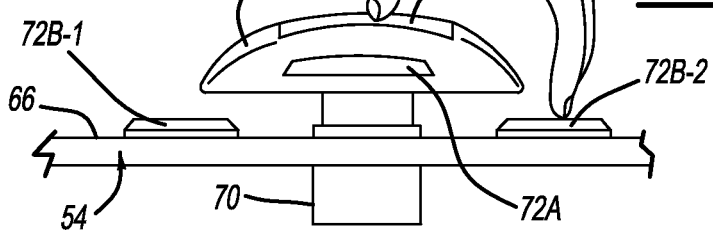
FIG - 6

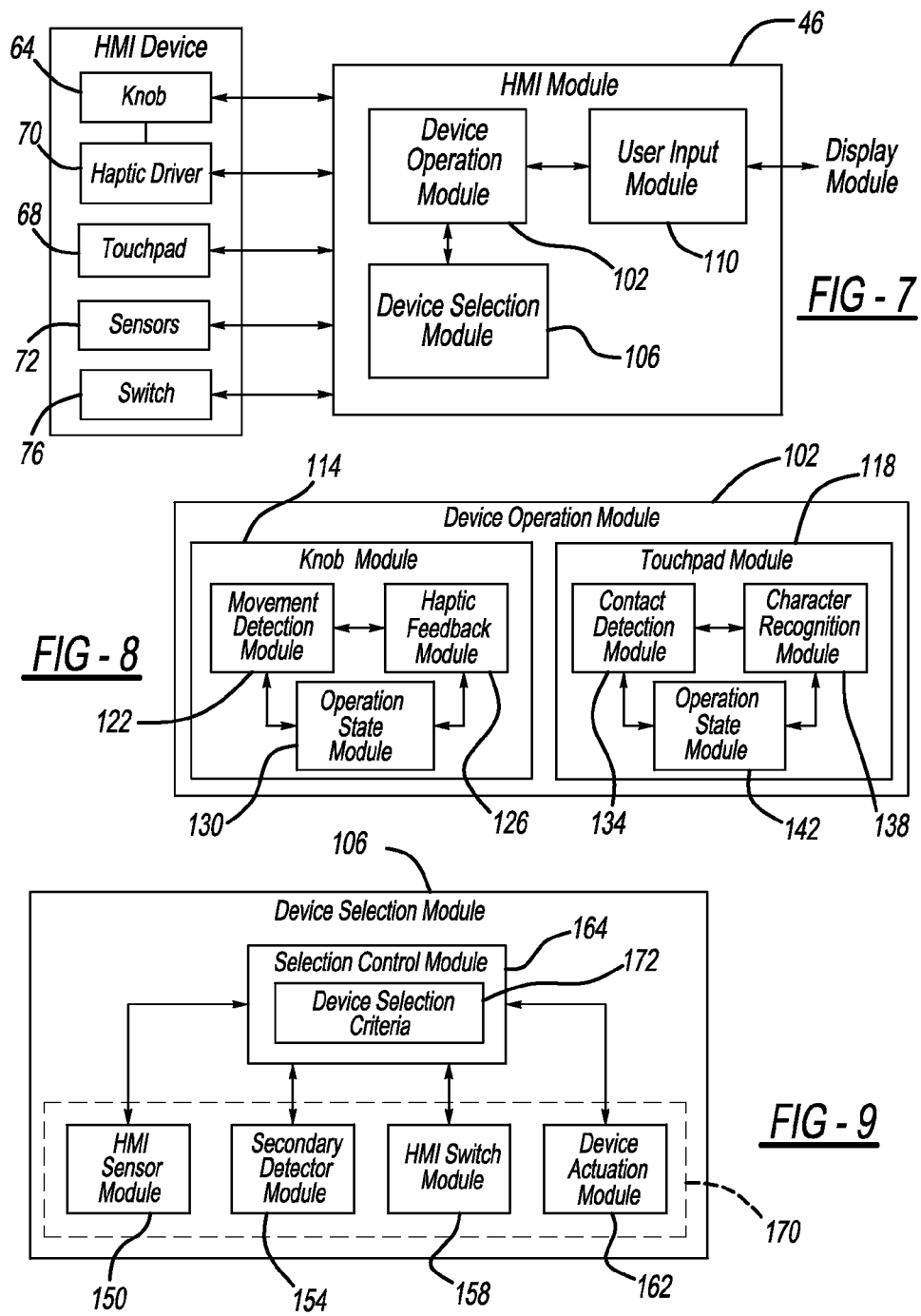

FIG - 11 (174)

| Device Selection Criteria | | SELECTION CONTROL MODULE | |
|---|---|---|---|
| HAND LOCATOR MODULE | | Knob | Touchpad |
| Determination | Output to Selection Control Module | | |
| Hand Position Sensors | | | |
| Only side sensors detect a hand | Knob to operated | O | X |
| Only rear lateral sensor detects a hand | Touchpad to be operated | X | O |
| Only front lateral sensor detect a hand | Touchpad to be operated | X | O |
| Side sensors and front lateral sensor detects hand | Knob to operated | O | X |
| Side sensors and rear lateral sensor detects hand | Touchpad to be operated | X | O |
| None of the sensors detect a hand | Neither Knob nor Touchpad to be operated | X | X |
| Secondary Detector | | | |
| *Camera* | | | |
| Fingers positioned at Knob only | Knob to operated | O | X |
| Fingers positioned at Touchpad only | Touchpad to be operated | X | O |
| Fingers not at Knob or Touchpad | Neither Knob nor Touchpad to be operated | X | X |
| Fingers positioned at Knob and Touchpad | Undetermined | O | O |
| *GUI* | | | |
| Control by Knob only | Knob to operated | O | X |
| Control by Touchpad only | Touchpad to be operated | X | O |
| Control by Knob or Touchpad | Knob or Touchpad to be operated | O | O |
| HMI Switch | | | |
| Knob selected | Knob to operated | O | X |
| Touchpad selected | Touchpad to be operated | X | O |
| No selection | Knob or Touchpad to be operated | O | O |
| HMI Device Input | | | |
| Knob selected based on movement | Knob to operated | O | X |
| Touchpad selected based on character recognized | Touchpad to be operated | X | O |
| No input from interface device | Neither Knob nor Touchpad to be operated | X | X |

| Active | O |
|---|---|
| Inactive | X |

HUMAN MACHINE INTERFACE SYSTEM FOR CONTROLLING VEHICULAR GRAPHICAL USER INTERFACE DISPLAY

FIELD

The present disclosure relates to a human machine interface system that controls a graphical user interface being displayed on a display of a vehicle. More particularly, to controlling one or more human machine interface devices of the human machine interface system.

BACKGROUND

This section provides background information related to the present disclosure which is not necessarily prior art. Human machine interface (HMI) devices such as knobs, dials, and touchpads, are located throughout a passenger cabin of a vehicle for allowing a passenger to control one or more vehicular systems. As an example, a series of buttons and dials located above a center console of the passenger cabin are operable by the passenger to control a climate system, an audio system, and/or a navigation system of the vehicle.

As another example, the vehicle may include a liquid crystal display (LCD) that displays a series of graphical user interfaces (GUIs) that allows the passenger to access and control the vehicular systems through graphical icons and visual indicators. The LCD may be equipped with a touchscreen that allows the passenger to operate the graphical icons by simply touching the icon. The passenger cabin can be equipped with both the LCD and the buttons/dials for operating the vehicular systems.

SUMMARY

This section provides a general summary of the disclosure, and is not a comprehensive disclosure of its full scope or all of its features.

The present disclosure provides for a human machine interface (HMI) system that controls the operation of a graphical user interface (GUI) being displayed by a display module on a display located in a vehicle. The human interface system includes an interface device, an interface operation module, and a device selection module.

The interface device is operable by a user to control the GUI being displayed. The interface device includes a knob member and a touchpad. The knob member may be moveable along multiple axes, and the touchpad may detect a touch by the user. The interface operation module controls the interface device and receives input data from the interface device in response to an operation of the interface device by the user.

The device selection module designates at least one of the knob member or the touchpad as an active device based on a device selection criteria. If the device selection module designates the knob member as the active device and the touchpad as an inactive device, the interface operation module transmits data from the knob member to the display module and disregards data from the touchpad. If the device selection module designates the touchpad as the active device and the knob member as the inactive device, the interface operation module transmits data from the touchpad to the display module and disregards data from the knob member.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a top view of the HMI device;

FIGS. 5 and 6 are side views of the HMI device;

FIG. 7 is a functional block diagram of the HMI system including the HMI device and an HMI module;

FIG. 8 is a functional block diagram of a device operation module of the HMI module;

FIG. 9 is a functional block diagram of a device selection module of the HMI module;

FIG. 11 is an example device selection criteria table; and

Corresponding reference numerals indicate corresponding parts throughout the several views of the drawings.

DETAILED DESCRIPTION

A vehicle may be equipped with one or more human machine interface (HMI) devices that allow a user to control and operate a vehicular system. In some vehicles, multiple HMI devices are used to control the same vehicular system. As an example, the HMI devices may include a touchpad and a knob that are located separately from a display. As input devices, either the touchpad or the knob are operable by the user to operate icons of a graphical user interface (GUI) presented on the display. At times, if the user is operating the touchpad to control the GUI, the user may inadvertently move the knob and, as a result, the GUI may be controlled by the knob and not the touchpad. To prevent the unintentional operation of the icon by a misused input device, an HMI system of the present disclosure controls an HMI device such that one of the input devices is active for the purpose of operating the GUI while the other input device is inactive.

Figure 1:
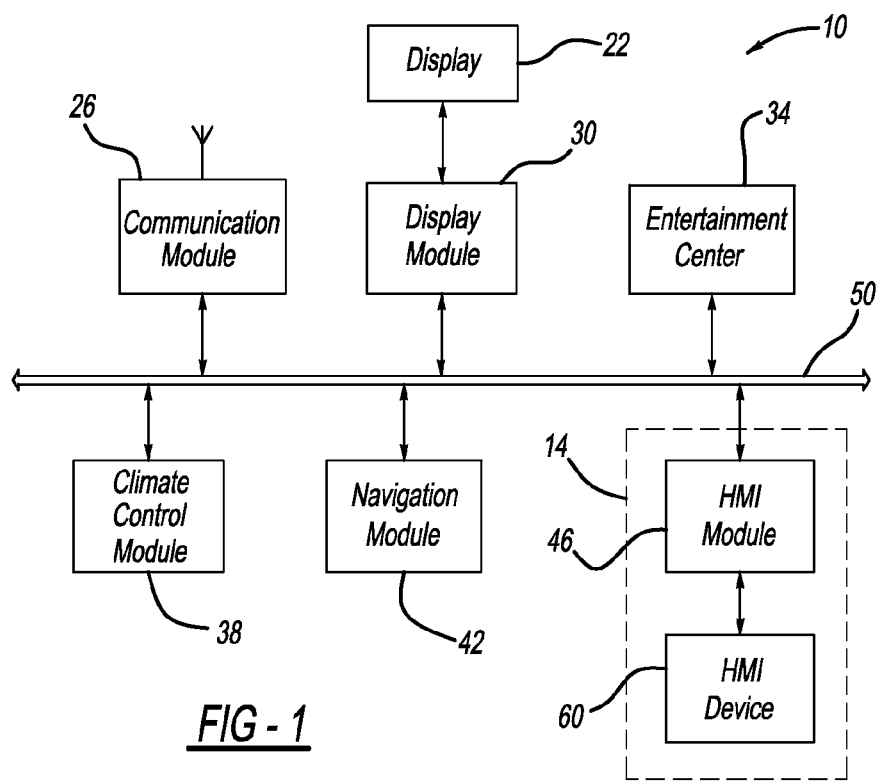
FIG. 1 is a functional block diagram of a vehicle system having a human machine interface (HMI) system of the present disclosure.
Figure 3:
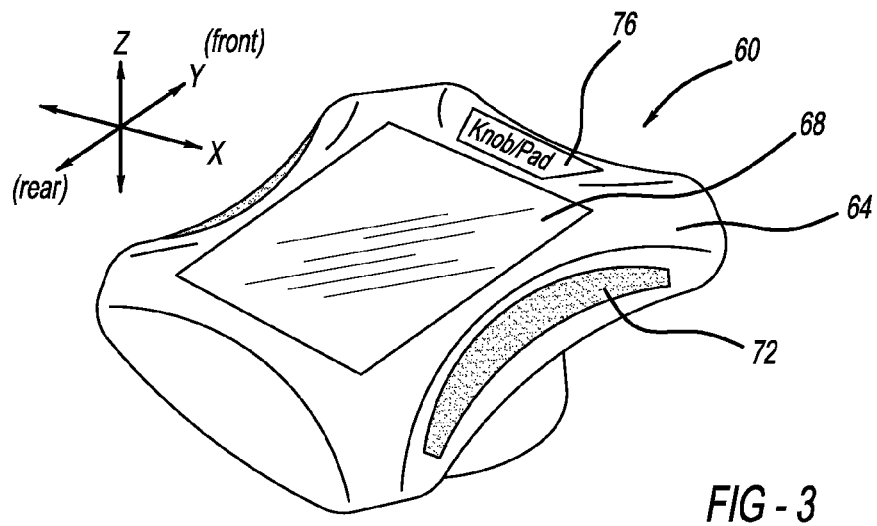
FIG. 3 is perspective view of the HMI device.
Figure 2:
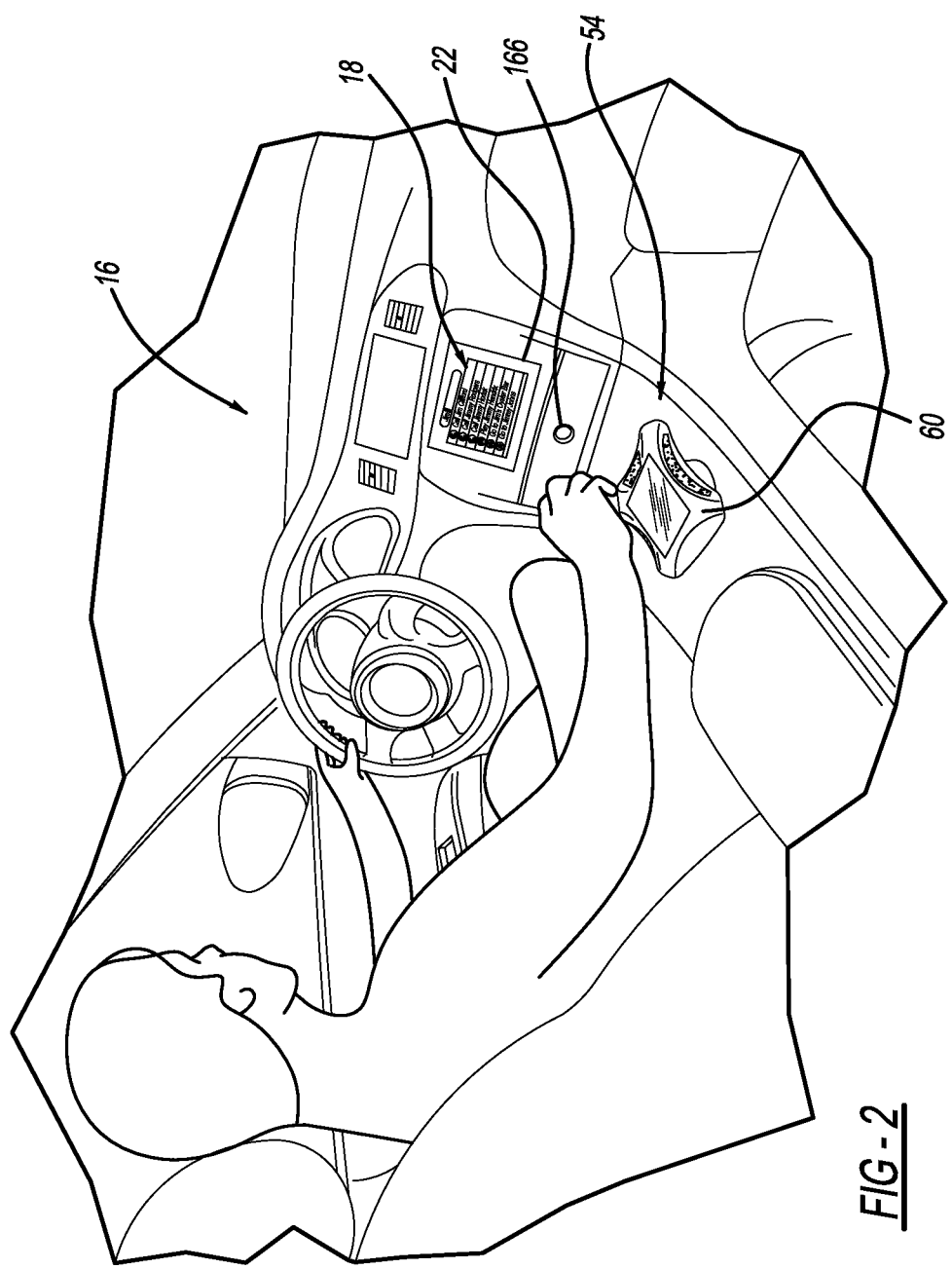
FIG. 2 illustrates an HMI device disposed in a passenger cabin of a vehicle.

The present disclosure will now be described more fully with reference to the accompanying drawings. FIGS. 1 and 2 illustrate an example of a vehicle system 10 that includes a human machine interface (HMI) system 14 of the present disclosure. The HMI system 14 is disposed in a vehicle and allows a user to control and operate a graphical user interface (GUI) 18 being displayed on a display 22 located in a passenger cabin 16 of the vehicle.

The vehicle system 10 may include a communication module 26, a display module 30, an entertainment module 34, a climate control module 38, a navigation module 42, and a human machine interface (HMI) module 46. The modules may communicate with each other by a communication network 50, such as a controller area network (CAN), a local interconnect network (LIN), or other suitable network.

The communication module 26 enables the vehicle system 10 to exchange data with portable devices disposed inside the vehicle and devices outside of the vehicle. As an example, the communication module 26 communicates with cellular phones, tablets, a server located at a remote site, and/or other vehicles. The communication module 26 establishes communication using satellite networks; terrestrial wireless networks; short range wireless networks, such as Bluetooth networks; and/or other suitable types of wireless communication networks.

The display module 30 controls the operation of the display 22. The display 22 is disposed above a center console 54 of the vehicle. The display 22 may be a liquid crystal display (LCD) that includes a touchscreen. The display module 30 displays the GUI 18 on the display 22. The GUI 18 includes a series of graphical interfaces each configured to display specific information for controlling a given vehicular system. As an example, one graphical interface may be a navigation interface for allowing the user to control a navigation system of the vehicle. Using the navigation interface, the user is able to enter a destination, request directions, and view a map indicating the vehicle's position. The display module 30 transmits information indicative of the user's operation of the navigation interface to the navigation module 42. The navigation module 42 in turn may transmit information to be displayed by the display module 30 on the display 22.

The entertainment module 34 operates as an in-vehicle entertainment center of the vehicle. For instance, using one or more speakers and/or one or more display consoles (e.g., liquid crystal displays) located in the passenger cabin 16 of the vehicle, the entertainment module 34 emits audio through the speakers and depicts images on the display consoles. The entertainment module 34 may access different types of media, such as radio, satellite radio, compact disc (CD), universal serial bus (USB) drives, audio applications stored on a portable device (e.g., smart phone, tablet), and other suitable media. The user may be able to access the different media by way of an entertainment interface that is displayed by the display 22 as the GUI 18.

The climate control module 38 controls the heat, ventilation, air-conditioning (HVAC) system of the vehicle. The user operates the HVAC system by controlling a climate control interface displayed on the display 22 as the GUI 18 by the display module 30. The display module 30 transmits information representing the user's operation of the climate control interface to the climate control module 38, and the climate control module 38 controls various components of the HVAC system based on the information received.

The navigation module 42 includes a global position system (GPS) and determines a location of the vehicle. The navigation module 42 may provide directions to a destination specified by the user. The directions, along with a map indicating the vehicle position and suggested route, may be transmitted to the display module 30.

The HMI system 14 includes the HMI module 46 and a remote HMI device 60 (i.e., "remote interface device" 60 hereinafter). In the example embodiment, the remote interface device 60 is disposed along the center console 54, but may be located at other suitable locations for allowing the user to access the remote interface device 60 with ease.

The HMI system 14 operates in conjunction with the display module 30 for allowing the user to access and control a given vehicular system by the GUI 18 being displayed on the display 22. As an example, the user operates the remote interface device 60 to select a command being displayed on the GUI 18 or input information, such as an address. The HMI module 46 transmits data indicative of an operation of the remote interface device 60 to the display module 30 by way of the network 50. The display module 30 controls the GUI 18 based on the data received so that the GUI 18 and/or the given vehicular system operates as instructed by the user. As an example, if the user operates the remote interface device 60 to scroll through a list being displayed, the display module 30 translates the data to a position on the GUI 18 and controls the GUI 18 to filter through the list based on the input from the remote interface device 60.

FIGS. 3 to 6 illustrate an example of the remote interface device 60. For explanation purposes, the remote interface device 60 is described with reference to an x-y-z coordinate system in which the x-y-z axes are orthogonal to each other. In addition, the relationship between the coordinate system and the vehicle is configured such that the front direction and the rear direction of the vehicle are parallel to the y-axis.

The interface device 60 includes a knob 64 and a touchpad 68, which are collectively referred to as input devices 64, 68. In the example embodiment, the touchpad 68 is located on a surface of the knob 64. Alternatively, the touchpad 68 may be separate from the knob 64. For example, the touchpad 68 may be disposed along an armrest, and the knob 64 may be located next to the touchpad 68 along the armrest, below the armrest, or at an end surface of the armrest.

The knob 64 is rotatable and slideable along each of the axes and transmits a signal reflective of its movement to the HMI module 46. As an example, the knob 64 may be rotated clockwise or counter clockwise about the z-axis. In a rest position, in which no force is being exerted on the knob 64, a rotational angle ($\theta$) measured from the y-axis is zero ($\theta=0$). A maximum rotational angle ($\theta_{Max}$) of the knob 64 may be set to ±45, ±90, ±180, or other suitable value. Accordingly, the knob 64 may be twisted about the z-axis by a rotational angle that is between zero and a maximum rotation angle (i.e., $-\theta_{max} \leq \theta \leq +\theta_{max}$).

The knob 64 is also slideable along the x-axis and the y-axis, such that the user can move the knob 64 right-left (i.e., along the x-axis), up-down (i.e., along the y-axis), or diagonally (i.e., within x-y plane). The knob 64 may also be pushed down in a direction parallel to the z-axis, such that the knob 64 moves downward toward a surface 66 of the center console 54 like a pushbutton.

The knob 64 may include a haptic driver 70 for providing a haptic feedback to the user based on the movement of the knob 64 and the GUI 18 being displayed on the display 22. The haptic driver 70 may include one or more motors for adjusting the rigidity of the knob 64 in order to provide the user a tactile feel of varying resistance. For example, the haptic driver may increase and/or decrease the resistance of the knob 64 in order to provide a discrete step like feedback when the user rotates and/or slides knob 64. That is, as the knob 64 moves, the haptic driver increases the friction such that the user feels a slight resistance, and when the movement of the knob 64 is greater than a preset amount, the friction drops and the user experiences a tactile feedback of overcoming a barrier. In another example, as the knob 64 is pressed down, the user may feel a click-like sensation. While selected examples of haptic feedback are described, other suitable haptic feedback may be used for providing tactile feel to the user.

The touchpad 68 senses and tracks the user's finger that is moving along the surface of the touchpad 68. The touchpad 68 may operate by capacitive sensing and conductance. As an example, the touchpad 68 may sense the capacitive virtual ground effect of a finger, or the capacitance between sensors. The touchpad 68 senses the position and movement of the finger along its surface and transmits the data to the HMI module 46.

The HMI system 14 may include one or more sensors 72 disposed on or around the remote interface device 60 for detecting a touch and/or a hand of the user. The sensors 72 may be used to identify whether the user intends to operate the knob 64 or the touchpad 68. In particular, by using ergonomic principals, the knob 64 and the touchpad 68 are configured to comfortably and naturally interact with the user's hand. The placement of the sensors 72 is based on the common interaction of the hand with the remote interface device 60 when the hand is operating the knob 64 or the touchpad 68.

In the example embodiment, the sensors 72 include side sensors 72A, a rear lateral sensor 72B-1, and a front lateral sensor 72B-2 (collectively referred to as lateral sensors 72B). The side sensors 72A are disposed on the knob 64 on either side of the touchpad 68. The lateral sensors 72B are disposed on the surface 66 of the center console 54 below the knob 64, and may be positioned in front of and behind the knob 64 (FIGS. 5 and 6). Based on the configuration of the remote interface device 60 and ergonomic principals, the side sensors 72A are disposed at a location commonly touched by the hand when the hand operates the knob 64 and the lateral sensors 72B are disposed at a location commonly touched by the hand when the hand operates the touchpad 68. While the figures illustrate specific locations of the sensors 72, the sensors 72 may be disposed at other locations on or around the interface device 60 and are not limited to the positions described herein.

In the example embodiment, the sensors 72 are capacitive sensors that detect a change in capacitance caused by a touch of the user's hand. The capacitive sensors may be single contact point sensors or multi-contact point sensors. The sensors 72 may also include pressure sensors, biometric sensors, infrared sensors, or other suitable types of sensors for detecting a touch and/or hand of the user. In the example embodiment, both of the side sensors 72A and the lateral sensors 72B are provided as capacitive sensors. Alternatively, the side sensors 72A and the lateral sensors 72B may be different type of sensors, and are therefore not required to be the same type of sensor.

The remote interface device 60 may also include a device selection switch 76 for selecting between the knob 64 and the touchpad 68. As an example, the switch 76 is configured to allow the user to select the knob 64 or the touchpad 68 (i.e., pad). When the touchpad 68 is selected, the position of the knob 64 is locked by the haptic driver 70 (i.e., a lock state). The haptic driver 70 prohibits the knob 64 from moving due to forces exerted on the knob 64 during, for instance, the operation of the touchpad 68. Accordingly, the HMI system 14 prevents the unintentional operation of the GUI 18 by the knob 64 and also stabilizes the touchpad 68 for the user's input. In the event that the knob 64 is selected, any touch detected by the touchpad 68 along its surface is ignored, and the GUI 18 is controlled by the knob 64. In an alternative embodiment, the switch 76 may be used to activate or deactivate one of the knob 64 or the touchpad 68. For instance, the switch 76 may lock or unlock the knob 64 and maintain normal operation of the touchpad 68 regardless of the state of the knob 64.

In the example embodiment, the device selection switch 76 is a touch switch disposed on the knob 64. The touch switch may be a capacitance based touch switch, resistance based touch switch, or other suitable touch switch. Alternatively, the device selection switch 76 may be a mechanical switch that is disposed on the remote interface device 60 or close to the remote interface device 60 so that the switch 76 is easily accessible by the user.

Referring to FIGS. 7-9, an example of the HMI module 46 is presented. The HMI module 46 includes a device operation module 102, a device selection module 106, and a user input module 110. The device operation module 102 controls the knob 64 and the touchpad 68, and receives input signals reflective of a movement of the knob 64 or an outline detected by touchpad 68. The device selection module 106 determines which of the input devices 64, 68 is to be operated by the user. The device that is not operated by the user is deactivated, and the device that is operated by the user controls the GUI 18 being displayed. The user input module 110 exchanges data with the display module 30 by the network 50. As an example, the user input module 110 may transmit data related to the input received from the remote interface device 60, and the display module 30 may transmit data regarding the GUI 18 being displayed.

FIG. 8 illustrates an example block diagram of the device operation module 102. The device operation module 102 includes a knob module 114 and a touchpad module 118. The knob module 114 controls the operation of the knob 64, and includes a movement detection module 122, a haptic feedback module 126, and an operation state module 130 (i.e., "knob state module" hereinafter).

The movement detection module 122 receives signals from the knob 64 in response to the knob 64 being rotated, glidingly moved in the x-y plane, and/or pressed downward. The movement detection module 122 determines the amount of movement experienced by the knob 64. That is, if the user twists the knob 64, the movement detection module 122 determines the angle of rotation of the knob 64. As another example, if the user slides the knob 64 in the left direction, the movement detection module 122 determines an intended distance traveled by the knob 64 based on, for example, the actual distance moved and the duration the knob 64 remained at the actual distance.

Since the knob 64 can be rotated and moved along a particular axis, situations may arise in which the knob 64 may move along an axis while the user is rotating the knob 64. Conversely, the knob 64 may slightly rotate when the user moves the knob 64 along an axis. Accordingly, the movement detection module 122 may first identify whether the knob 64 is being rotated or moved in the x-y plane. For example, based on the signals received, the movement detection module 122 may distinguish between a rotational movement and a gliding movement. Once the movement detection module 122 recognizes the movement, any secondary movement that may occur can be ignored. Thus, if the user is rotating the knob 64, the movement detection module 122 may ignore signals reflective of a gliding movement as the knob 64 is being rotated.

The haptic feedback module 126 controls the haptic feedback function of the knob 64 by the haptic driver 70. The haptic feedback module 126 includes a haptic library that associates a given haptic feedback with a given object displayed on the GUI 18. For example, if the object being displayed is a circular dial, the associated haptic feedback may be a discrete step like feel. As another example, the library may include, as a haptic feedback, a lock state that locks the position of the knob 64 at the rest position.

The knob state module 130 receives an input from the device selection module 106 as to whether the knob 64 is an active device or an inactive device. If the knob 64 is an active device, the operation state module 130 instructs the movement detection module 122 to transmit the movement of the knob 64 to the user input module 110. If the knob 64 is the inactive device, the operation state module 130 instructs the haptic feedback module 126 to lock the position of the knob 64 by executing the lock state of a haptic feedback. In addition to or in lieu of locking the knob 64, the operation state module 130 may instruct the movement detection module 122 to ignore signals from the knob 64. The haptic driver 70 may lock the knob 64 such that the knob 64 is not moveable in the x-y plane, cannot be pressed downward, and/or is not rotatable. That is, the knob 64 may be locked such that it cannot move in one or more axes.

The touchpad module 118 interprets the signals from the touchpad 68 to determine the character input by the user. In particular, the touchpad module 118 includes a contact detection module 134, a character recognition module 138, and an operation state module 142 (i.e., a touchpad state module). The contact detection module 134 receives signals reflective of locations along the surface of the touchpad 68 where the touchpad 68 detects a touch. Based on the locations detected, the contact detection module 134 creates a gesture input.

The character recognition module 138 determines a character and/or control operation that substantially matches the gesture input received. As an example, based on a library of predefined characters and/or control operations, the character recognition module 138 may associate a tap as an execute or an enter command. As another example, the character recognition module 138 may associate a drag operation as a command to control a pointer, a dial, or a scroll bar displayed on the GUI 18.

The touchpad state module 142 receives an input from the device selection module 106 as to whether the touchpad 68 is an active device or an inactive device. If the touchpad 68 is an active device, the operation state module 130 instructs the character recognition module 138 to output the character and/or control operation detected to the user input module 110. If the touchpad 68 is inactive, the operation state module 130 instructs the character recognition module 138 to disregard the character and/or control operation detected and not to output it to the user input module 110.

The contact detection module 134 and the character recognition module 138 may be combined as one module and may use various suitable algorithms/programs for recognizing a given touch input. Alternatively, the character recognition module may be part of the display module 30, and the touchpad state module 142 may instruct the contact detection module 134 to transmit or not to transmit the gesture input to the display module 30 by way of the user input module 110.

FIG. 9 illustrates an example block diagram of the device selection module 106. The device selection module 106 receives data from multiple sensors, the switch 76, the device operation module 102, and other devices, to determine if the remote interface device 60 is being utilized. If the remote interface device 60 is being utilized, the device selection module 106 selects one of the input devices 64, 68 of the remote interface device 60 as the active device and the other as the inactive device, or selects both input devices 64, 68 as active devices.

The device selection module 106 includes an HMI sensor module 150, a secondary detector module 154, an HMI switch module 158, a device actuation module 162, and a selection control module 164. The HMI sensor module 150, the secondary detector module 154, the HMI switch module 158, and the device actuation module 162, locate the position of the hand with respect to the remote interface device 60, and are collectively referred to as a hand locator module 170. Based on the information from the hand locator module 170, the device selection control module 164 determines which input device 64, 68 is active and/or inactive. While the example embodiment utilizes each of the modules 150, 154, 158, and 162, any one or any combination of the modules may be provided as the hand locator module 170.

The HMI sensor module 150 receives input from the sensors 72 and determines whether one or more of the sensors 72 detects the hand. If one or more of the sensors 72 detect the hand, the HMI sensor module 150 determines which of the input devices 64, 68 the user intends to operate. That is, based on the configuration of the remote interface device 60 and ergonomic principals, the HMI sensor module 150 is configured to determine which sensor 72 or combination of sensors 72 indicate that the user intends to use the knob 64, the touchpad 68, or both the knob 64 and touchpad 68.

As an example, if only the side sensors 72A sense a touch, the HMI sensor module 150 determines that the user intends to use the knob 64. If only the rear lateral sensor 72B-1 or only the front lateral sensor 72B-2 senses a touch, the HMI sensor module 150 determines that the user intends to use the touchpad 68. If the side sensors 72A and the front lateral sensor 72B-2 sense a touch, the HMI sensor module 150 determines that the user intends to use the knob 64. If the side sensors 72A and the rear lateral sensor 72B-1 sense a touch, the HMI sensor module 150 determines the user intends to use the touchpad 68. When none of the sensors 72 sense a touch, the HMI sensor module 150 determines that the hand is not located at the remote interface device 60.

Figure 10:
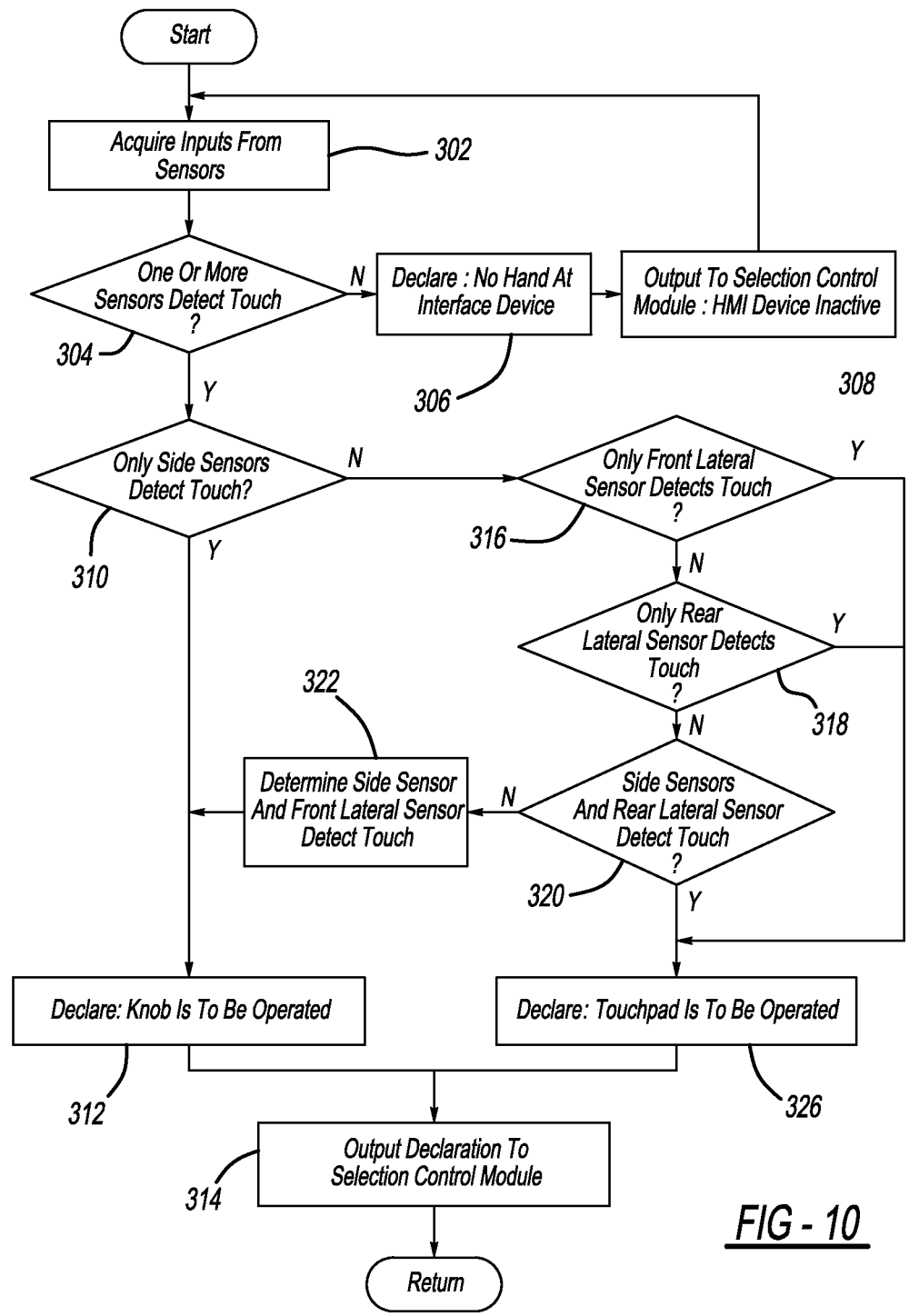
FIG. 10 is a flowchart of an HMI sensor routine for detecting a hand position of a user.

Referring to FIG. 10, an example HMI sensor routine that is executed by the HMI sensor module 150 for determining which input device 64, 68 is to be operated by the user is depicted. The HMI sensor module 150 may execute the routine when it receives power from a vehicle battery. The HMI sensor module 150 begins at 302, where the HMI sensor module 150 acquires input from the sensors 72. At 304, the HMI sensor module 150 determines if one or more of the sensors 72 detect a touch. If none of the sensors 72 detect a touch, the HMI sensor module 150 declares at 306 that the hand is not at the remote interface device 60, and at 308 outputs a signal to the selection control module 164 that neither the knob 64 nor the touchpad 68 is to be operated by the user. That is, since none of the sensors 72 detected a touch, the HMI sensor module 150 determines that the user does not intend to use the input devices 64, 68. It is possible that the user may be touching the touchpad without activating the sensors 72, in which case the other modules of the hand locator module 170 may detect the operation of the touchpad 68, as described further below, and provide the information to the selection control module 164.

If one or more sensors 72 detect a touch, the HMI sensor module 150 determines if only the side sensors 72A detect touch at 310. If only the side sensors 72A detect a touch, the HMI sensor module 150 declares that the knob 64 is to be operated at 312, and outputs information indicative of the determination to the selection control module at 314. If sensors other than the side sensors 72A detect a touch, the HMI sensor module 150 at 316 determines if only the front lateral sensor 72B-2 detects a touch. If sensors other than the front lateral sensor 72B-2 detect a touch, the HMI sensor module 150 determines if only the rear lateral sensor 72B-1 detects a touch at 318. If sensors other than the rear lateral sensor 72B-1 detect a touch, the HMI sensor module 150 determines if the side sensors 72A and the rear lateral sensor 72B-1 detects a touch at 320. That is, at 320 the HMI sensor module 150 has determined that the side sensors 72A and one of the lateral sensors 72B detected a touch (i.e., 310: NO; 316: NO; 318: NO). Therefore, the HMI sensor module 150 needs to determine if the one or more sensors that detected the touch include the side sensors 72A and the rear lateral sensor 72B-1, or include the side sensors 72A and the front lateral sensor 72B-2. Thus, at 320 the HMI sensor module 150 determines if the side sensors 72A and the rear lateral sensor 72B-1 detect a touch.

If the HMI sensor module 150 determines that the side sensors 72A and the rear lateral sensor 72B-1 did not detect the touch, then the HMI sensor module 150 determines at 322 that the side sensors 72A and the front lateral sensor 72B-2 detected a touch. From 322, the HMI sensor module 150 goes to 312 to declare that the knob 64 is to be operated and to 314 to output information to the selection control module 164. If the HMI sensor module 150 determines that only the front lateral sensors 72B-2 detected a touch (316: YES), or only the rear lateral sensor 72B-1 detected a touch (318: YES), or the side sensors and the rear lateral sensor detected a touch (320: YES), the HMI sensor module 150 declares that the touchpad 68 is to be operated at 326 and outputs the determination to the selection control module 164 at 314. The routine of FIG. 10 is just one example for determining a position of the hand based on the sensors 72, and other methods may be used to analyze the input from the sensors 72.

The secondary detector module 154 receives inputs from other sensors and/or devices disposed within the vehicle. For example, the secondary detector module 154 may receive images from a camera 166 disposed in the passenger cabin 16 and capture images that include the remote interface device 60. Based on the images received, the secondary detector module 154 processes the images using a gesture recognition process to determine if the user's hand is operating the knob 64 or the touchpad 68. For instance, if the user's fingers are on the parameter of the knob 64 and not at the touchpad 68, the secondary detector module 154 determines that the knob 64 is to be operated. If the user's fingers are at the touchpad 68, the secondary detector module 154 determines that the touchpad 68 is to be operated. If the user's fingers are at both the knob 64 parameter and the touchpad 68, the secondary detector module 154 only determines that the hand is at the remote interface device 60. That is, the determination by the secondary detector module 154 is inconclusive as to whether the knob 64 or the touchpad 68 is being operated.

In another example, the secondary detector module 154 may receive information from the display module 30 regarding the GUI 18 being displayed and whether the user is permitted to use the knob 64, the touchpad 68, or both the knob 64 and the touchpad 68 for operating the GUI 18. If the GUI 18 can only be operated by the knob 64, then the touchpad 68 is declared as inactive. Alternatively, if the GUI 18 can only be operated by the touchpad 68, then the knob 64 is declared as inactive. If both the knob 64 and the touchpad 68 can be used, the secondary detector module 154 determines both may be active.

The HMI switch module 158 receives inputs from the switch 76 and determines if the knob 64 or the touchpad 68 is activated/deactivated. That is, when the switch 76 is operated to select one of the knob 64 or touchpad 68, the HMI switch input module 158 receives a control signal from the switch 76. If the switch 76 is operated to activate the knob 64, the HMI switch input module 158 determines that the knob 64 is to be an active device and the touchpad 68 an inactive device. If the switch 76 is operated to activate the touchpad 68, the HMI switch input module 158 determines that the touchpad 68 is to be an active device and the knob 64 an inactive device. If the switch 76 is not operated to select the knob 64 or the touchpad 68, the HMI switch input module 158 determines that the both the knob 64 and touchpad 68 are active devices.

The device actuation module 162 determines whether the knob 64 or the touchpad 68 is being used to operate the GUI 18 based on movement of the knob 64 and/or gesture received by the touchpad 68. For example, the knob 64 may move due to movement of the vehicle and/or when the touchpad 68 is being operated. In addition, the touchpad 68 may output signals to the touchpad module 118 when the user touches the touchpad 68 as the user is operating the knob 64. Accordingly, the device actuation module 162 analyzes the movement of the knob 64 and/or the input inscribed on the touchpad 68 to determine whether the knob 64 or the touchpad 68 is being used to operate the GUI 18. The device actuation module 162 may receive information regarding the movement of the knob 64 and the input gesture of the touchpad 68 from the input device 64 and 68, respectively. Alternatively, the device actuation module 162 may receive the information from the knob module 114 and the touchpad module 118.

With respect to the knob 64, the device actuation module 162 determines whether the movement of the knob 64 is greater than an operation threshold. The operation threshold may be set with respect to a vibrational movement of the knob 64 due to movement of the vehicle and/or movement during operation of the touchpad 68. The movement of the knob 64 due to such vibration is less than the movement of the knob 64 when the user intends to operate the knob 64. Accordingly, if the movement of the knob 64 is less than the operation threshold (e.g., ±2 degrees, ±3 degrees), then the device actuation module 162 determines that the knob 64 is not being operated. If the movement of the knob 64 is greater than the threshold, the device actuation module 162 determines that the knob 64 is being operated.

The device actuation module 162 further determines whether the touchpad 68 is being used to control the GUI 18 based on the touch detected by the touchpad 68. That is, the device actuation module 162 analyzes the input using a character recognition program to determine if the input is one of the characters and/or operation controls available to the user. If the input is not a recognized character and/or operation control, the device actuation module 162 determines that the touchpad 68 is not being operated. If the input is a recognized character and/or operation control, then actuation module 163 determines that the touchpad 68 is being used.

The selection control module 164 determines which input device 64, 68 is active and which device is inactive. In particular, the selection control module 164 utilizes predefined device selection criteria 172 to select the knob 64 and/or the touchpad 68 as the active device. The device selection criteria 172 associates a given input from the hand locator module 170 with a control of the remote interface device 60. As an example, if the switch 76 is actuated to activate the knob 64, the device selection criteria 172 associates this input from the hand locator module 170 with activating the knob 64 and deactivating the touchpad 68 so that the touch detected by the touchpad 68 is ignored and not transmitted to the display module 30, and any movement of the knob 64 is transmitted to the display module 30.

FIG. 11 illustrates a device selection criteria table 174 as an example of the device selection criteria 172. The device selection criteria table 174 includes hand position determinations from four different detection methods: hand position sensor, secondary detector, HMI switch, and HMI device input. The hand position sensor, secondary detector, HMI switch, and HMI device input are representative of the determinations made by the HMI sensor module 150, the secondary detector module 154, the HMI switch module 158, and the device actuation module 162, respectively.

"O" represents that the device is active, and "X" represents that the device is inactive. When a given determination indicates "O" for both the knob 64 and the touchpad 68, the selection control module 164 recognizes the given determination as only indicating that the hand is located at the remote interface device 60 and may review the remaining determinations to further determine if the hand is operating the knob 64 or the touchpad 68. For example, if the switch indicates that neither the knob 64 nor the touchpad 68 has been selected, the selection control module 164 may analyze the other determinations to ascertain which device is being used. Accordingly, the selection control module 164 may be configured to activate and deactivate the input devices 64, 68 based on one or more of the determinations.

The device selection criteria 172 may prioritize the determinations received from the hand locator module 170 so that if two determinations conflict with each other, the determination having the higher priority is used to control the remote interface device 60. As an example, determinations from the HMI switch module 158 may be ranked at a higher priority than the HMI sensor module 150, such that if the switch 76 is operated to select the touchpad 68, and only the side sensors 72A detect the touch, the device selection criteria 172 determines that the touchpad 68 is active and the knob 64 is inactive because of the priority given to the HMI switch module 158. The device selection criteria 172 may rank the modules of the hand locator module 170 in the following order: the HMI switch module 158, the HMI sensor module 150, the secondary detector module 154, and the device actuation module 162.

Figure 12:
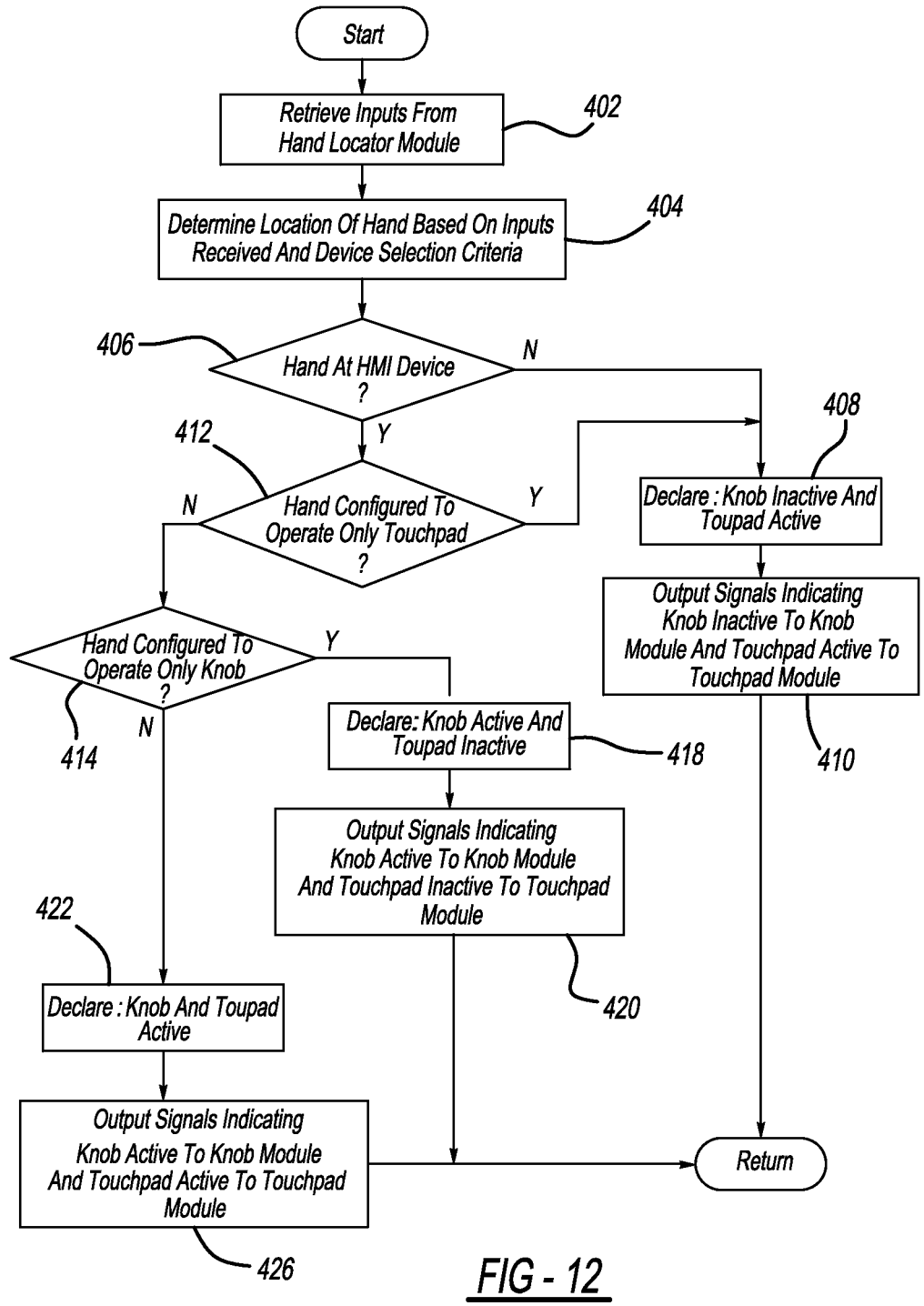
FIG. 12 is a flowchart of an input device selection routine for controlling the HMI device.

Referring to FIG. 12, an example input device selection routine that may be executed by the selection control module 164 is depicted. The selection control module 164 may execute the routine when it receives power from the vehicle battery. The selection control module 164 begins the routine at 402 where it acquires inputs from the hand locator module 170. As an example, the selection control module 164 receives information from one or more of the modules 150, 154, 158, and 162. At 404, the selection control module 164 determines the location of the hand based on the inputs received and the device selection criteria 172. That is, the selection control module 164 determines the location of the user's hand with respect to the remote interface device 60 and, more particularly, the input devices 64, 68.

At 406, the selection control module 164 determines if the user's hand is at the remote interface device 60. That is, if any one of the inputs received from the hand locator module 170 indicates that the knob 64 is to be operated and/or the touchpad 68 is to be operated, the selection control module 164 determines that the user's hand is at the remote interface device 60. If the user's hand is not at the remote interface device 60, the selection control module 164 at 408 declares that the knob 64 is inactive and the touchpad 68 is active, and at 410 outputs a signal to the knob module 114 indicating that the knob 64 is inactive and a signal to the touchpad module 118 that the touchpad 68 is active. In the example embodiment, the knob 64 is set as inactive to prevent movement of the knob 64 when the remote interface device 60 is not being operated. Alternatively, the selection control module 164 may keep both the knob 64 and the touchpad 68 active.

If the hand is at the remote interface device 60, the selection control module 164 determines if the hand is configured to operate only the touchpad 68 at 412. If only the touchpad 68 is to be operated, the selection control module 164 declares that the knob 64 is inactive and the touchpad 68 is active at 408, and outputs a signal to the knob module 114 indicating that the knob 64 is inactive and a signal to the touchpad module 118 that the touchpad 68 is active at 410.

If the hand is not configured to operate the touchpad 68, the selection control module 164 determines if the hand is configured to operate only the knob 64 at 414. If the hand is configured to only operate the knob 64, the selection control module 164 declares that the knob 64 is active and the touchpad 68 is inactive at 418, and outputs a signal to the knob module 114 indicating that the knob 64 is active and a signal to the touchpad module 118 indicating that the touchpad 68 is inactive at 420. If the hand it not configured to operate only the knob 64, the selection control module 164 declares at 422 that the knob 64 and the touchpad 68 are active. That is, since the user's hand is at the remote interface device 60, and the hand locator module 170 did not designate one of the input devices 64, 68 as being operated, the selection control module 164 determines that either one of the input devices 64, 68 may be operated. Thus, the selection control module 164 outputs a signal to the knob module 114 indicating that the knob 64 is active and a signal to the touchpad module 118 indicating that the touchpad 68 is active at 426.

The HMI system 14 of the present disclosure prevents the unintentional operation of the GUI 18 by determining the position of the hand with respect to the remote interface device 60. For example, by determining the position of the user's hand, the HMI system 14 may prevent the operation of the GUI 18 when an object, such as a bag strap that is wrapped around the remote interface device 60, operates one of the input devices 64, 68 and not the user. The HMI system 14 also prevents the unintentional operation of the GUI 18 by an inactive device. Specifically, the HMI system 14 determines whether the user intends to use the knob 64 or the touchpad 68. The HMI system 14 may then have one of the input devices as an active device for the purpose of operating the GUI 18 while the other input device is inactive.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A human machine interface system for controlling operation of a graphical user interface being displayed by a display module on a display located in a vehicle, the human interface system comprising:
   an interface device operable to control the graphical user interface, the interface device including a knob member and a touchpad, wherein the knob member is moveable, and the touchpad detects a touch by the user;
   an interface operation module controlling the interface device and receiving input data from the interface device in response to an operation of the interface device; and
   a device selection module designating at least one of the knob member or the touchpad as an active device based on a device selection criteria;
   wherein:
   the interface operation module transmits data from the knob member to the display module and disregards data from the touchpad in response to the device selection module designating the knob member as the active device and the touchpad as an inactive device;
   the interface operation module transmits data from the touchpad to the display module and disregards data from the knob member in response to the device selection module designating the touchpad as the active device and the knob member as the inactive device; and
   the device selection criteria identifies at least one of the knob member or the touchpad as the active device based on at least one of a movement of the knob or an input touch detected by the touchpad, such that:
   the device selection module designates the knob member as the active device and the touchpad as the inactive device in response to the knob member being moved a distance greater than or equal to a predetermined threshold; and
   the device selection module designates the touchpad as the active device and the knob member as the inactive device in response to the interface operation module recognizing the input touch detected by the touchpad as a valid input.

2. The human machine interface system of claim 1 further comprising:
   one or more sensors disposed on a surface of the knob member and which detect a touch by the user, wherein
   the device selection criteria identifies the at least one of the knob member or the touchpad as the active device based on the one or more sensors, such that the device selection module designates the knob member as the active device and the touchpad as the inactive device in response to the one or more sensors detecting the touch.

3. The human machine interface system of claim 2 wherein the device selection module designates the knob member and the touchpad as active devices in response to the one or more sensors not detecting the touch.

4. The human machine interface system of claim 1 wherein the interface operation module locks the knob member in response to the device selection module designating the knob member as the inactive device, such that the knob member is not moveable.

5. The human machine interface system of claim 1 further comprising:
   an interface switch operable to select at least one of the knob member or the touchpad, wherein
   the device selection criteria identifies at least one of the knob member or the touchpad as the active device based on the interface switch, such that the device selection module designates the knob member as the active device and the touchpad as the inactive device in response to the interface switch selecting the knob member, and the device selection module designates the knob member as the inactive device and the touchpad as the active device in response to the interface switch selecting the touchpad.

6. The human machine interface system of claim 1 wherein the touchpad is located on a surface of the knob.

7. The human machine interface system of claim 1 further comprising:
   a surface sensor disposed at a surface of the knob member and operable to detect a touch by the user; and
   a lateral sensor disposed adjacent to the knob member at a surface below the knob member and operable to detect the touch by the user, wherein
   the device selection criteria identifies at least one of the knob member or the touchpad as the active device based on the surface sensor and the lateral sensor, such that:
   the device selection module designates the knob member as the active device in response to the surface sensor detecting the touch and the lateral sensor not detecting the touch, and
   the device selection module designates the touchpad as the active device and the knob member as the inactive device in response to the lateral sensor detecting the touch and the surface sensor not detecting the touch.

8. The human machine interface system of claim 7 wherein the device selection module designates the knob member and the touchpad as active devices in response to the surface sensor and the lateral sensor not detecting the touch.

9. The human machine interface system of claim 1 wherein:
   the knob member is rotatable about a first axis and slideable along a second axis and a third axis, and the first axis, the second axis, and the third axis are orthogonal to each other, and
   the interface operation module locks the knob member in response to the knob member being the inactive device, such that the knob member is not moveable in at least one the first axis, the second axis, or the third axis.

10. A human machine interface system for controlling operation of a graphical user interface being displayed by a display module located in a vehicle, the human interface system comprising:
    an interface device operable to control the graphical user interface, the interface device including a knob member and a touchpad;
    an interface operation module receiving input data from the interface device according to an operation of at least one of the knob member or the touchpad by the user;
    a hand locator module determining a hand position of the user relative to the interface device; and
    a device selection module designating at least one of the knob member or the touchpad as an active device based on the hand position determined by the hand locator module, wherein
    the interface operation module permits movement of the knob member and disregards input data associated with operation of the touchpad in response to the device selection module designating the knob member as the active device and the touchpad as an inactive device, and
    the interface operation module analyzes the input data associated with the operation of the touchpad and locks a position of the knob member in response to the device selection module designating the touchpad as the active device and the knob member as the inactive device.

11. The human machine interface system of claim 10 wherein;
    the interface operation module transmits input data associated with a movement of the knob member to the display module and disregards input data associated with an operation of the touchpad in response to the device selection module designating the knob member as the active device and the touchpad as an inactive device, and
    the interface operation module transmits input data associated with the operation of the touchpad to the display module and disregards input data associated with the movement of the knob member in response to the device selection module designating the touchpad as the active device and the knob member as the inactive device.

12. The human machine interface system of claim 10 further comprising:
    one or more sensors disposed at a surface of the knob, wherein the one or more sensors detect a touch, wherein
    the hand locator module determines that the knob member is to be operated in response to the one or more sensors detecting the touch, and
    the device selection module designates the knob member as the active device and the touchpad as the inactive device in response to the hand locator module determining that the knob member is to be operated.

13. The human machine interface system of claim 10 further comprising:
    a surface sensor operable to detect a touch and disposed at a surface of the knob member;
    a front lateral sensor operable to detect the touch and disposed adjacent to the knob member at a surface of the interface device below and anterior of the knob member; and
    a rear lateral sensor disposed adjacent to the knob member at a surface of the interface device below and posterior of the knob member, wherein
    the hand locator module determines the hand position based on the touch detected by at least one of the surface sensor, the front lateral sensor, or the rear lateral sensor.

14. The human machine interface system of claim 13 wherein:
    the hand locator module determines that the knob member is to be operated in response to only the surface sensor detecting the touch, and
    the device selection module designates the knob member as the active device and the touchpad as the inactive device in response to the hand locator module determining that the knob member is to be operated.

15. The human machine interface system of claim 13 wherein:
    the hand locator module determines that the touchpad is to be operated in response to only the rear lateral sensor or only the front lateral sensor detecting the touch, and
    the device selection module designates the touchpad as the active device and the knob as the inactive device in response to the hand locator module determining that the touchpad is to be operated.

16. The human machine interface system of claim 10 wherein the touchpad is located along a surface of the knob member.

17. A human machine interface system for controlling operation of a graphical user interface being displayed by a display module on a display located in a vehicle, the human interface system comprising:
- an interface device operable to control the graphical user interface, the interface device including a knob member and a touchpad, wherein the knob member is moveable, and the touchpad detects a touch by the user;
- an interface operation module controlling the interface device and receiving input data from the interface device in response to an operation of the interface device; and
- a device selection module designating at least one of the knob member or the touchpad as an active device based on a device selection criteria;
- wherein the interface operation module transmits data from the knob member to the display module and disregards data from the touchpad in response to the device selection module designating the knob member as the active device and the touchpad as an inactive device;
- wherein the interface operation module transmits data from the touchpad to the display module and disregards data from the knob member in response to the device selection module designating the touchpad as the active device and the knob member as the inactive device;
- a surface sensor disposed at a surface of the knob member and operable to detect a touch by the user; and
- a lateral sensor disposed adjacent to the knob member at a surface below the knob member and operable to detect the touch by the user;
- wherein the device selection criteria identifies at least one of the knob member or the touchpad as the active device based on the surface sensor and the lateral sensor, such that:
    - the device selection module designates the knob member as the active device in response to the surface sensor detecting the touch and the lateral sensor not detecting the touch; and
    - the device selection module designates the touchpad as the active device and the knob member as the inactive device in response to the lateral sensor detecting the touch and the surface sensor not detecting the touch.

* * * * *